United States Patent

Chang et al.

[11] Patent Number: 6,029,339
[45] Date of Patent: Feb. 29, 2000

[54] METHOD OF MAKING WRITE HEAD WITH RECESSED STITCHED YOKE ON A PLANAR PORTION OF AN INSULATION LAYER DEFINING ZERO THROAT HEIGHT

[75] Inventors: Thomas Young Chang; Mohamad Towfik Krounbi; Edward Hinpong Lee, all of San Jose; Douglas Johnson Werner, Fremont, all of Calif.

[73] Assignee: International Business Machines Corporation, Armonk, N.Y.

[21] Appl. No.: 09/034,427

[22] Filed: Mar. 4, 1998

Related U.S. Application Data

[62] Division of application No. 08/740,354, Oct. 28, 1996, Pat. No. 5,805,391.

[51] Int. Cl.[7] .................................................. G11B 5/41
[52] U.S. Cl. .................................... 29/603.14; 29/603.15
[58] Field of Search ........................... 29/603.14, 603.15; 360/122, 126

[56] References Cited

U.S. PATENT DOCUMENTS

| | | | |
|---|---|---|---|
| 4,423,451 | 12/1983 | Chi | 360/125 |
| 4,589,042 | 5/1986 | Anderson et al. | 360/125 |
| 4,636,897 | 1/1987 | Nakamura et al. | 360/119 |
| 4,636,901 | 1/1987 | Ohura et al. | 360/126 |
| 4,839,197 | 6/1989 | Henderson | 427/116 |
| 4,853,815 | 8/1989 | Diepers | 360/126 |
| 4,985,985 | 1/1991 | Das | 29/603 |
| 5,109,311 | 4/1992 | Hanazono et al. | 360/119 |
| 5,130,877 | 7/1992 | Hsie et al. | 360/126 |
| 5,184,394 | 2/1993 | Hsie et al. | 29/603 |
| 5,198,949 | 3/1993 | Narisawa et al. | 360/126 |
| 5,245,493 | 9/1993 | Kawabe et al. | 360/126 |
| 5,255,142 | 10/1993 | Williams et al. | 360/126 |
| 5,296,979 | 3/1994 | Kawabe et al. | 360/97.01 |
| 5,325,254 | 6/1994 | Cooperrider | 360/126 |
| 5,333,086 | 7/1994 | Frey et al. | 360/126 |
| 5,390,062 | 2/1995 | Matsuzawa et al. | 360/126 |

FOREIGN PATENT DOCUMENTS

| | | | |
|---|---|---|---|
| 58-111116 | 7/1983 | Japan | G11B 5/12 |
| 60-10409 | 1/1985 | Japan | G11B 5/31 |
| 61-178710 | 8/1986 | Japan | G11B 5/31 |
| 62-062415 | 3/1987 | Japan . | |
| 63-168811 | 7/1988 | Japan . | |

*Primary Examiner*—Carl E. Hall
*Attorney, Agent, or Firm*—Gray Cary Ware & Freidenrich LLP; Ervin F. Johnston

[57] ABSTRACT

An inductive write head has a pole tip region between an air bearing surface (ABS) and a flare point, and a yoke region located between the flare point and a back gap. The write head includes first and second pole piece layers, wherein the second pole piece layer has first and second components. The first component extends from an ABS end, which is located at the ABS, to a recessed end which is located in the yoke region. The second component extends from a recessed end, which is spaced from the ABS, to the back gap. The second component interfaces with the first component in a stitched region so that the first component defines a pole tip in the pole tip region and the second component defines a yoke in the yoke region. A first insulation layer extends from a recessed end, which is spaced from the ABS, into the yoke region. The recessed end of the first insulation layer defines a zero throat height. The first component is sandwiched between the first insulation layer and the second component. The pole tip of the first component can be formed with well-defined side walls during a photoresist step since a flared portion of the second pole piece is located in a planar region of the first insulation layer. With this arrangement, reflective notching into the second pole piece region is avoided. Secondly, a large pedestal formed by the second pole piece provides a large region to stitch the yoke. Due to the large real estate available to stitch the yoke, its forward placement can be recessed from the ABS.

27 Claims, 13 Drawing Sheets

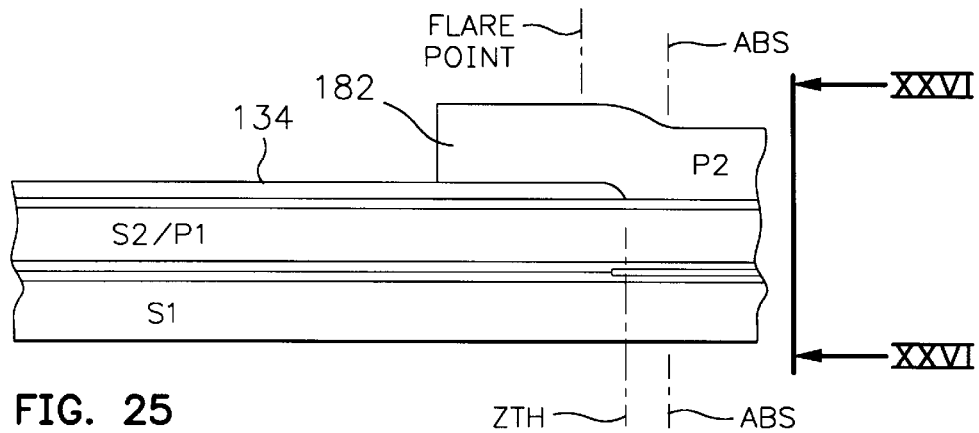
FIG. 25
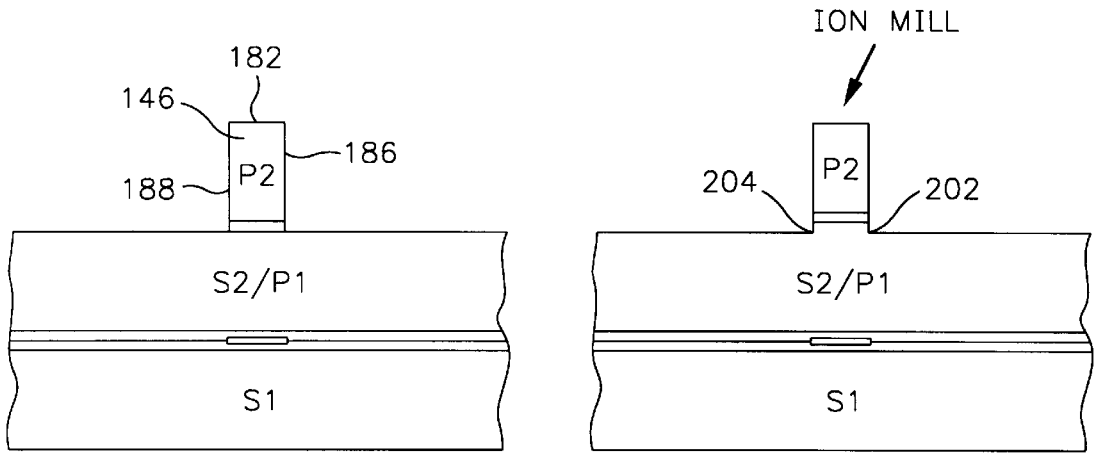
FIG. 26
FIG. 27
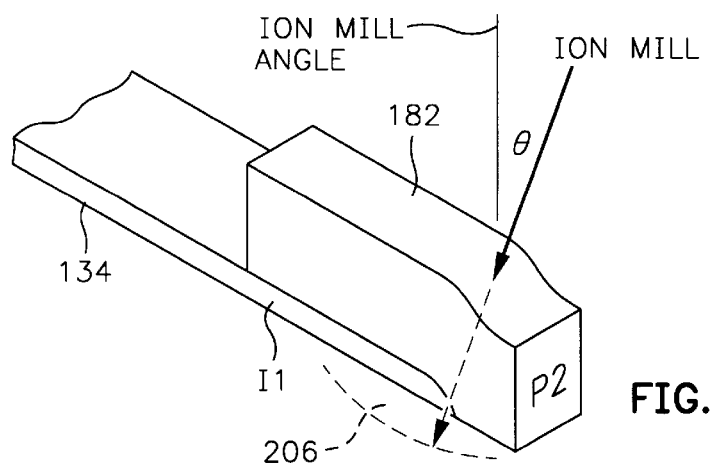
FIG. 28

METHOD OF MAKING WRITE HEAD WITH RECESSED STITCHED YOKE ON A PLANAR PORTION OF AN INSULATION LAYER DEFINING ZERO THROAT HEIGHT

REFERENCE TO RELATED APPLICATION

This application is a divisional application of application Ser. No. 08/740,354 filed Oct. 28, 1996, which issued as U.S. Pat. No. 5,805,391.

BACKGROUND OF THE INVENTION

1. Field of the Invention

The present invention relates to a write head which has a recessed stitched yoke on a planar portion of a zero throat height (ZTH) defining insulation layer and more particularly to a write head which has first and second components, the first component extending from an air bearing surface (ABS) to form a pole tip and a second component recessed and connected to the first component over a flat portion of a first insulation layer that defines ZTH.

2. Description of the Related Art

An inductive write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head. The pole piece layers are connected at a back gap. Current conducted to the coil layer induces a magnetic field across the gap between the pole pieces. This field fringes across the gap at the ABS for the purpose of writing information in tracks on moving media, such as in circular tracks on a rotating disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the write field seen at the recording medium. Since the magnetic flux decays as it travels down the length of the second pole tip, more flux will reach the recording media if the length of the second pole tip is made short. Therefore, optimal performance can be achieved by aggressively placing the flare point close to the ABS so that the second pole tip is made short.

Another parameter important to the design of the write head is the location of the zero throat height (ZTH). Zero throat height is the location where the first and second pole pieces first separate from one another after the ABS. The ZTH separation is caused by the contour of an insulation layer, typically the first insulation layer in the insulation stack. Flux leakage between the first and second pole pieces is further minimized by locating the ZTH as close as possible to the ABS. Also, sloping sides further hinders post processing steps such as ion milling.

Unfortunately, the aforementioned design parameters present a dilemma in the fabrication of the second pole tip. The second pole tip should be well-defined in order to produce well-defined written tracks on the rotating disk. Poor definition of the second pole tip may result in over-writing of adjacent tracks. A well-defined second pole tip should have parallel planar side walls which are perpendicular to the horizontal plane of the first pole piece layer. In most write heads the second pole tip is formed along with the yoke after the formation of the first insulation layer, the coil layer and the second and third insulation layers. Each insulation layer includes a hard-baked photoresist having a sloping front surface.

The sloping surface defines an apex angle which rises from a plane normal to the ABS. After construction, the first, second and third insulation layers present sloping surfaces which face the ABS. The sloping surfaces of the hard-bake resist exhibit a high optical reflectivity. When the second pole tip and yoke are constructed, a thick layer of photoresist is spun on top of the insulation layers and photo patterned to shape the second pole tip, using the conventional photo-lithography technique. In the photo-lithography step an exposing beam, such as light, is directed vertically through slits in an opaque mask, exposing areas of the photoresist which are to be removed by a subsequent development step. One of the areas to be removed is the area where the second pole piece (pole tip and yoke) are to be formed by plating. Unfortunately, when the location of the flare point is placed on the sloping surfaces of the insulation layers ultraviolet light will be reflected forward toward the ABS into photo-resist areas at the sides of the second pole tip area. After developing, the side walls of the photoresist are cut which causes the pole tip to be poorly formed after plating. This is called "reflective notching". As stated hereinabove this causes overwriting of adjacent tracks on a rotating disk. It should be evident that, if the flare point is recessed far enough into the head, the effect of reflective notching would be reduced or eliminated since it would occur behind the sloping surfaces. However, this solution produces a long second pole tip which quickly degrades the head's ability to effectively write on the recording medium.

Future high density recording will require heads with first and second pole tips that have side walls that are vertically aligned. Such structures provide superior on track and track edge writing characteristics at high linear and high track densities. Ion milling techniques are typically used to fabricate such write head structures. In this process the first pole is milled into using the second pole tip as a mask. Automatic alignment of the first and second pole tip is achieved since the second pole tip is used as the milling mask to protect the region of the first pole tip that is directly beneath it while the unprotected P1 material on either side of the second pole tip P2 is removed by the milling process. The effect of this milling process forms a "notched P1" structure which has the aligned vertical side walls between P1 and P2. Unfortunately, when the second pole tip is poorly formed, the notches in the first pole piece are poorly formed.

In order to overcome the aforementioned reflective notching and P1 notching problems some second pole pieces are constructed from two or more components wherein a first component forms the second pole tip. The first component is constructed before the insulation layers to eliminate the reflective notching problem. After forming the first pole piece layer and the write gap layer, a photoresist layer is spun on the partially completed head. The photoresist layer is very flat so that ultraviolet light from the photo-patterning step is not reflected forward. After construction of the first insulation layer, the coil layer and the second and third insulation layers, the second component of the second pole piece is stitched to the first component at the ABS, and extends from the ABS to the back gap. Since the second pole tip is well-formed, well-formed notches can be made in the first pole piece.

Another problem with this head is that the ZTH is dependent upon the location of the recessed end of the first component. Since the first component has to be long enough to provide a sufficient stitching area, this length may result in undesirable flux leakage between the first and second pole pieces. Therefore, a small real estate is available to stitch the second component to the first pole piece component. This causes the second pole piece component to extend out into the ABS. Since the second component of the pole piece is typically wider than the first component of the pole piece, viewed from the ABS, the second pole piece has a T-shape. The upright portion of the T is the front edge of the first component of the second pole piece, and the cross of the T is the front edge of the second component. A problem with this configuration is observed during operation when flux fringes from the outer corners of the second component of the pole piece T, to the first pole piece, which can cause adjacent tracks to be overwritten.

Accordingly, there is a strong felt need to provide an inductive write head wherein definition of the side walls of the second pole tip is substantially unaffected by the locations of the flare point and the ZTH.

SUMMARY OF THE INVENTION

The present invention permits the construction of a write head with a well-formed second pole tip, without dependence upon the locations of the flare point. This is accomplished by several unique configurations of the write head. In all configurations, the second pole piece layer includes first and second components. The first component extends from an ABS end to a recessed end located in the yoke region. The second component extends from a recessed end spaced from the ABS to the back gap. The second component is connected to the first component in a stitched region where the first component defines a pole tip in the pole tip region and the second component defines the yoke in the yoke region.

In another unique configuration, the first insulation layer has a relatively long planar region commencing at a rounded recessed end which is spaced from the ABS. The apex of this rounded recessed end defines the ZTH. The flare point of the second pole piece is located in this planar region. Since the region is planar, light is not reflected forward; instead the light is reflected back to its source, thereby obviating reflective notching. This permits the construction of a well-formed second pole tip. Further, if the ZTH-defining insulation layer is kept thin, a start of the planar region forms close to the ZTH. Therefore, the flare point can be placed on the planar region very close to the ZTH to produce a very efficient write head. In this unique configuration, the edge location of the first insulation layer defines the ZTH rather than the length of the second pole tip. Therefore, a large real estate is made available to stitch the two components of the second pole tip. The large stitch region allows the second component to be attached inside the head behind the ABS. Therefore, the recessed second component does not extend to the ABS. The ABS view does not show the problematic T-shaped pole tip, thereby eliminating flux fringing from the upright portion of the T. Since the second pole tip is well-formed the first pole piece can be notched by ion milling to form well-defined notches in the first pole piece at the ABS. Further, the second pole piece forms a mask to protect the write gap layer during the ion milling step used to construct the coil layer. Several embodiments of the head are provided. In one embodiment the first component defines the flare point and in the second embodiment the second component defines the flare point.

An object of the present invention is to provide an inductive write head having a well-formed second pole tip in which the flare point is relatively close to the ABS.

Still another object is to provide a method of making an inductive write head where there is substantially no reflective notching of the side walls of a resist frame formed to construct a second pole tip, even though the flare point is placed relatively close to the ABS.

Another object is to provide an inductive write head wherein the construction of a well-formed second pole tip is not dependent upon the locations of the flare point.

A further object is to provide an inductive write head which has well-formed first and second pole pieces at the ABS, a ZTH which is recessed a relatively short distance in the head from the ABS and/or a flare point which is recessed a relatively short distance from the ZTH into the head.

Other objects and attendant advantages of the present invention will become apparent upon reading the following description taken together with the accompanying drawings.

BRIEF DESCRIPTION OF THE DRAWINGS

FIG. 25 is the same as FIG. 24 except the second pole tip has been plated and the photoresist layer has been removed;

FIG. 26 is a view taken along plane XXVI—XXVI of FIG. 25 prior to ion milling the first pole piece;

FIG. 27 is an ABS view taken along plane XXVII—XXVII of FIG. 22 after ion milling has been employed to notch the first pole piece;

FIG. 28 is a schematic isometric illustration showing shadowing during the step of notching the first pole piece of the second embodiment by ion milling;

DESCRIPTION OF THE PREFERRED EMBODIMENTS

Figure 1:
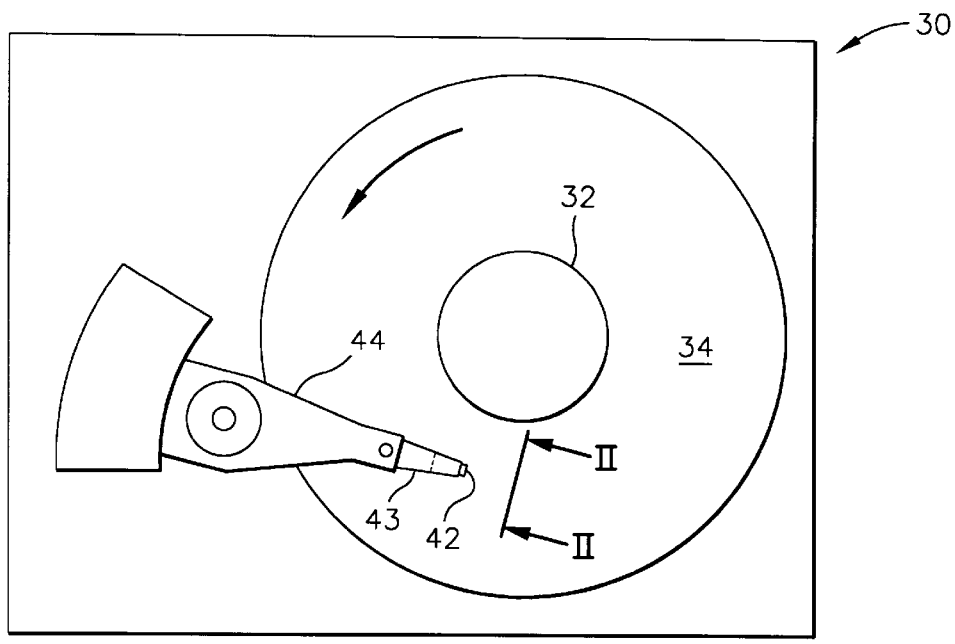
FIG. 1 is a planar view of an exemplary magnetic disk drive.
Figure 2:
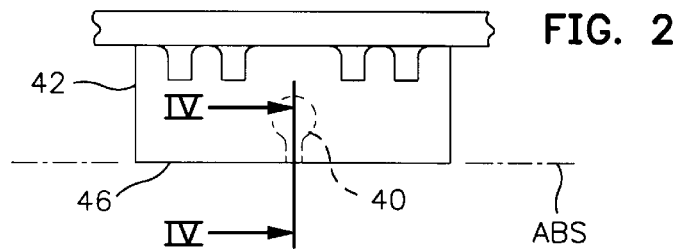
FIG. 2 is an end view (trailing edge) of a slider taken along plane II—II showing a magnetic head in hidden lines.
Figure 3:
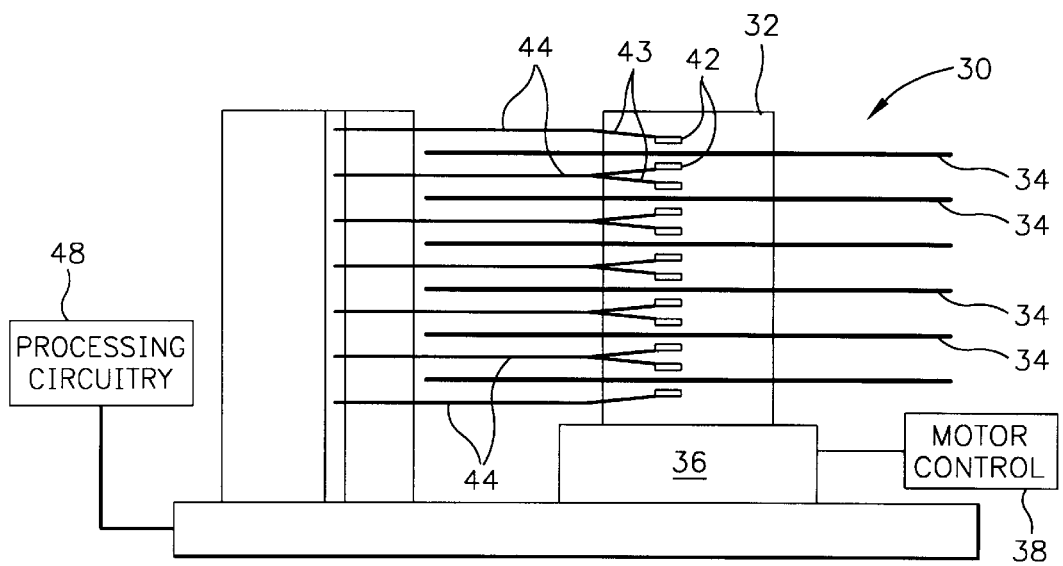
FIG. 3 is an elevation view of the magnetic disk drive of FIG. 1 wherein multiple disks and magnetic heads are employed.

Referring now to the drawings wherein like reference numerals designate like or similar parts throughout the several views there is illustrated in FIGS. 1 and 2 a magnetic disk drive 30. The drive 30 includes a spindle 32 which supports and rotates a magnetic disk 34. The spindle 32 is rotated by a motor 36 controlled by motor controller 38. A magnetic head 40, which may be a merged MR head for recording and reading information on the disk 34, is mounted on a slider 42 which, in turn, is supported by a suspension 43 and actuator arm 44. A plurality of disks, sliders and suspensions may be employed in a large capacity direct access storage device (DASD) as shown in FIG. 3. The suspension 43 and actuator arm 44 position the slider 42 to place the magnetic head 40 in a transducing relationship with a surface of the magnetic disk 34. When the disk 34 is rotated by the motor 36, the slider is supported on a thin (typically, 0.075 µm) cushion of air (air bearing) by the air bearing surface (ABS) 46. The magnetic head 40 is then employed for writing information to multiple circular tracks on the surface of the disk 44 and for reading information therefrom. Processing circuitry 48 exchanges signals representing such information with the head 40, provides motor drive signals, and also provides control signals for moving the slider to various tracks. It should be understood that the head 40 may alternatively be employed in a magnetic tape drive (not shown).

Figure 4:
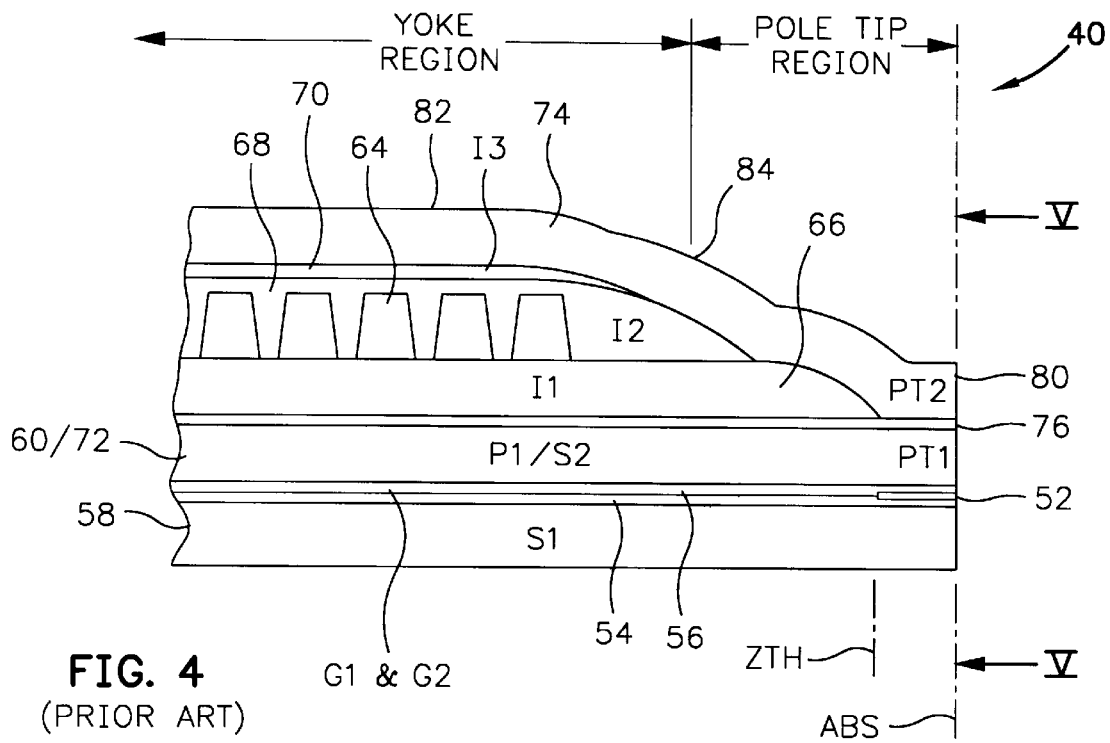
FIG. 4 is an elevation side view of a prior art magnetic head taken along plane IV—IV of FIG. 2.

FIG. 4 is a side cross-sectional elevation view of a prior art merged MR head 40 which has a write head portion and a read head portion. The read head portion of the merged MR head includes an MR sensor 52 sandwiched between first and second gap layers 54 and 56, the first and second gap layers, in turn, being sandwiched between first and second shield layers 58 and 60. In response to external magnetic fields, the resistance of the MR sensor 52 changes. A sense current conducted through the MR sensor causes these changes to be manifested as potential changes. These potential changes are processed by the processing circuitry 48 shown in FIG. 3.

The write head portion of the head includes a coil layer 64 sandwiched between first and second insulation layers 66 and 68. A third insulation layer 70 may be employed for planarizing the head to eliminate ripples in the second insulation layer caused by the coil layer 64. The coil layer 64, and the first, second and third insulation layers 66, 68 and 70 are sandwiched between first and second pole piece layers 72 and 74. The first and second pole piece layers 72 and 74 are separated by a write gap layer 76 at the ABS and are magnetically coupled at a back gap (not shown) which is spaced from the ABS. As shown in FIG. 4, the second pole piece layer 74 has a pole tip 80 and a yoke 82, the merging of these components being defined by a flare point 84 which is the location where the second pole piece layer 74 begins to widen as it recesses in the head. The second pole tip 80 extends from the ABS to the flare point 84, and the yoke extends from the flare point 84 to the back gap. See also FIG. 7 for the location of pole tip 80', yoke 82' and flare point 84' as defined by a resist frame. It should be noted that the merged MR head 40 employs a single layer 60/72 to serve a double function as a second shield layer for the read head and as a first pole piece for the write head. A piggyback MR head employs two separate layers for these functions.

Figure 7:
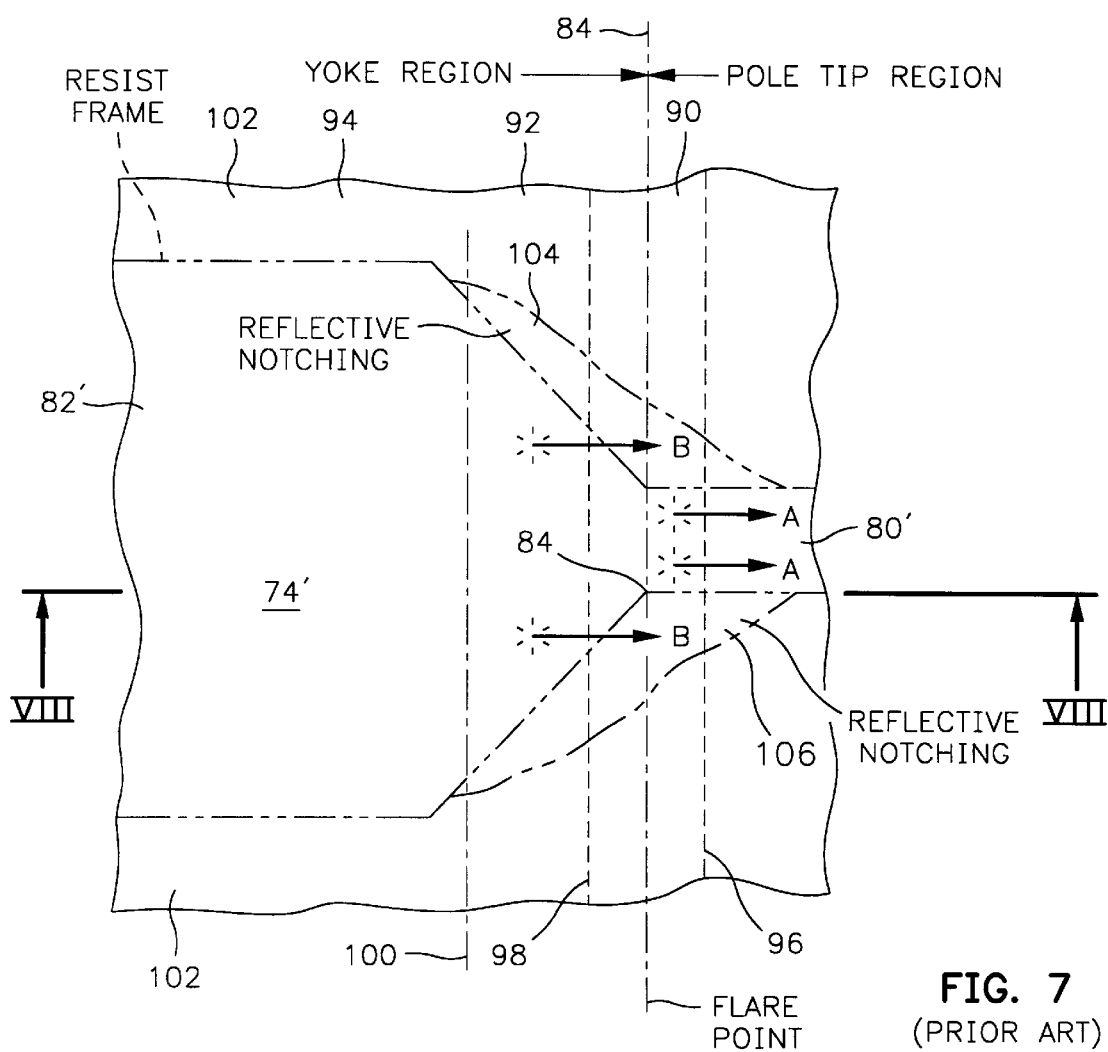
FIG. 7 is a planar view of the partially completed head shown in FIG. 6 with the resist frame shown in phantom.
Figure 8:
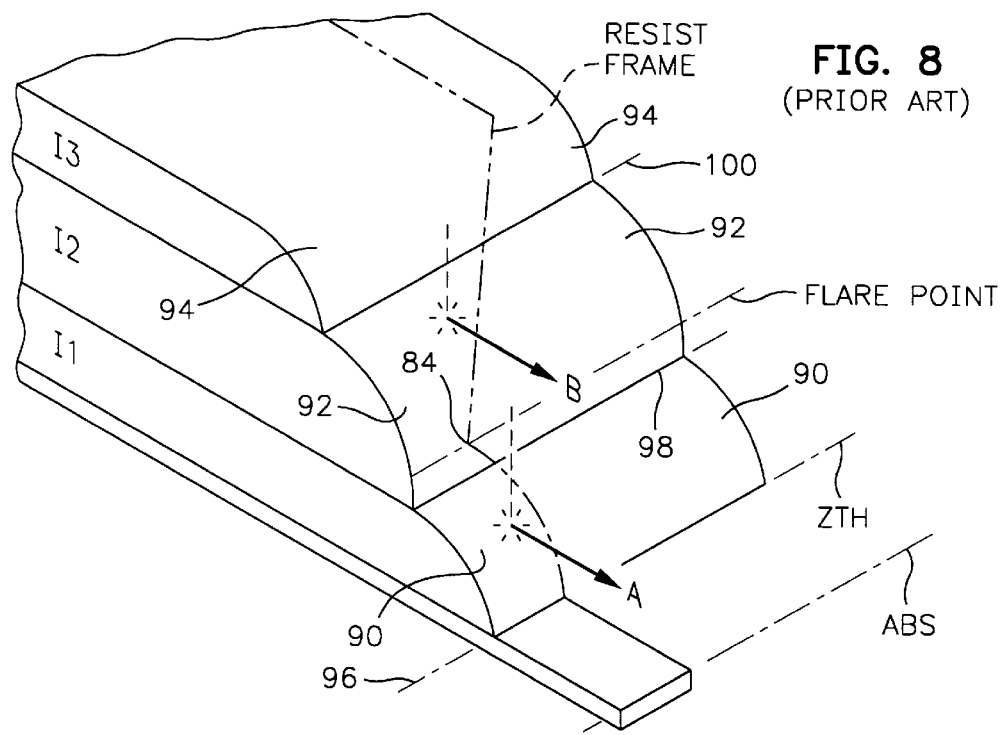
FIG. 8 is an isometric elevation view taken generally along plane VIII—VIII of FIG. 7 with the photoresist layer removed so as to show the first, second and third insulation layers.

The location of the flare point 84, shown in FIGS. 4, 7 and 8, is an important design parameter of the write head. The further this point is recessed into the head, the longer the pole tip 80, which increases its magnetic inductance and the likelihood that it will saturate in response to flux from the coil layer 64. In the past it has been difficult to locate the flare point closer to the ABS than 10 µm because of a fabrication problem in making the second pole tip 80.

Another important design parameter in making the write head portion is the location of a zero throat height (ZTH), which is where the first and second pole piece layers 72 and 74 first separate from one another behind the ABS. It is important to locate the ZTH as close as possible to the ABS (typically within about 1 µm) in order to reduce the flux loss between the pole pieces 70 and 74 before the fields reach the gap layer 76 at the ABS. In the prior art, locating the ZTH close to the ABS contributed to the aforementioned problem of fabricating a well-defined second pole tip 80. Accordingly, the prior art was faced with a trade-off between constructing a well-defined second pole tip 80 with the zero throat height located far from the ABS, or a poorly defined pole tip with the zero throat height located close to the ABS.

Figure 6:
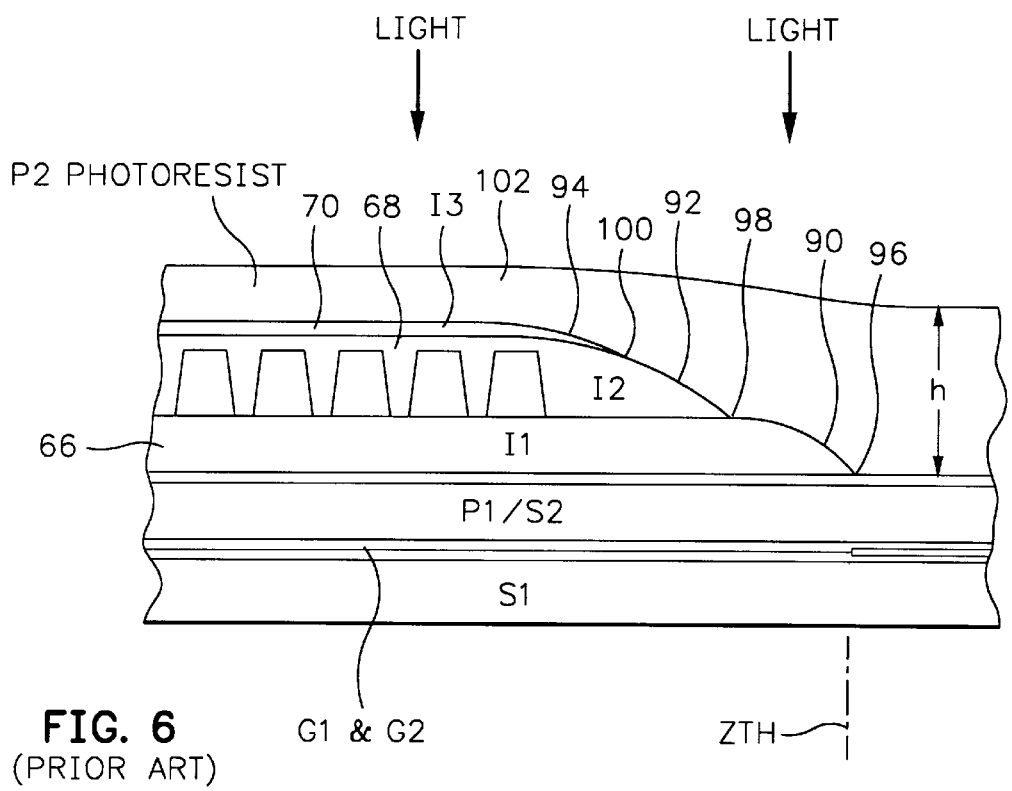
FIG. 6 is an elevation side view of the prior art head in FIG. 4 in a partially completed state.

FIG. 6 shows the prior art head of FIG. 4 during the step of constructing the second pole piece 74 (see FIG. 4). In FIG. 6 the first, second and third insulation layers 66, 68 and 70 are shown with sloping surfaces 90, 92 and 94 respectively, which terminate at apexes 96, 98 and 100 respectively. As stated hereinabove, the first, second and third insulation layers are hard-baked photoresist which results in the sloping surfaces 90, 92 and 94 being highly reflective to light. All of the sloping surfaces 90, 92 and 94 face the pole tip region where the second pole tip of the second pole piece 74 is to be formed. The second pole piece is formed with a photoresist layer 102 spun on top of the partially completed head and planarized thereacross. The height h or the photoresist may be as much as 12 µm thick in the pole tip region and is typically approximately 4.5 µm thick above the third insulation layer.

Figure 5:
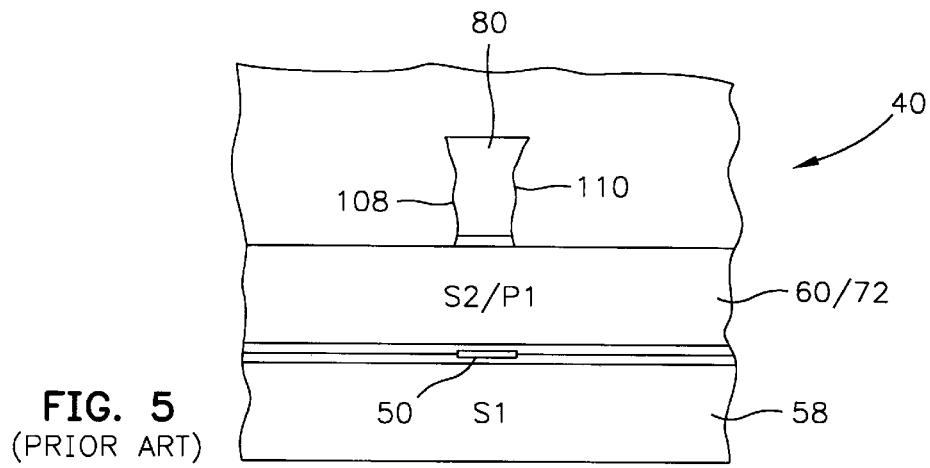
FIG. 5 is an ABS view of the magnetic head of FIG. 4 taken along plane V—V.

Since the flare point 84 of the second pole piece 74 (shown in FIGS. 4, 7 and 8) is located on the sloping surfaces of the insulation layers, light will be reflected forward toward the ABS into the photoresist 102 from the sloping surfaces, penetrating into photoresist side wall areas of the pole tip region and causing notching of the photoresist. This will result in the side walls of the photoresist in the pole tip region being wider than the mask employed for patterning. This is referred to as "reflective notching" and is illustrated in FIG. 7. The photoresist pattern for the second pole piece is shown at 74' which comprises the pole tip pattern 80' and the yoke pattern 82'. This is referred to as the "P2 frame". Reflective notching of the photoresist 102 by light reflected at an angle of incidence from the sloping layers of the insulation layers is shown at 104 and 106. As indicated by the notation "A" in FIGS. 7 and 8, when light is directed downwardly during the photo-imaging step of the photoresist, it is reflected at an angle of incidence into the pole tip region without causing any reflective notching of the second pole tip. However, notation "B" shows light from the photo-imaging process reflected from the sloping surfaces of the insulation layers behind the flare point 84, which causes the light to be reflected by an angle of incidence into the photoresist 102 along a side of the intended pole tip 80' shown in FIG. 7. It is light reflection B and similar light reflections that cause the reflective notching shown in FIG. 7. When the second pole piece 74 is plated and the photoresist layer 102 is removed the head is complete, as shown in FIG. 4. However, the pole tip 80 is poorly formed, exhibiting irregular side walls 108 and 110, as shown in FIG. 5. Furthermore, photoresist notching results in irregular second pole tip 80 that has wider areas at the upper pole tip region than at the base of the pole tip (adjacent to the write gap). When such irregular second pole tip 80 is used as a milling mask to notch into the first pole tip 72, the wider regions on the second pole tip shadows milling beam. Thus, the milling process is less effective at removing the first pole tip material directly beneath the side walls of the second pole tip. This results in a poorly formed P1 notched write head structure due to incomplete notching of the first pole piece 72.

Figure 9:
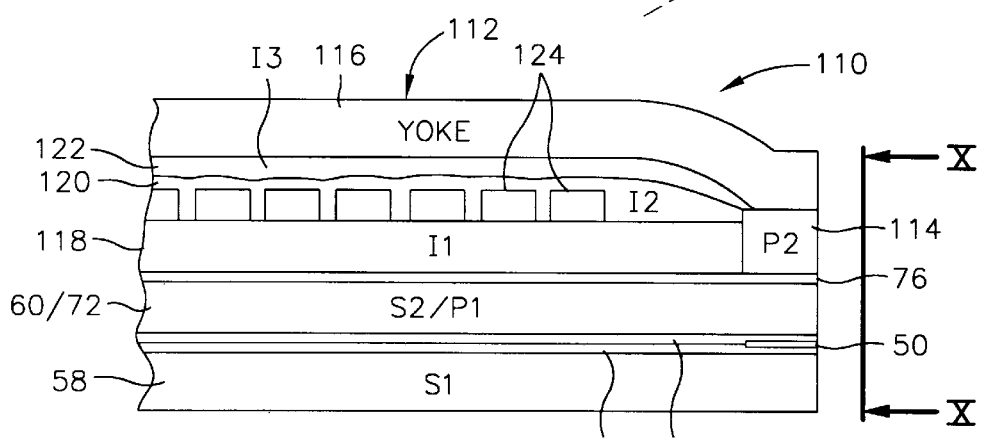
FIG. 9 is a cross-sectional elevation view of another prior art magnetic head.
Figure 10:
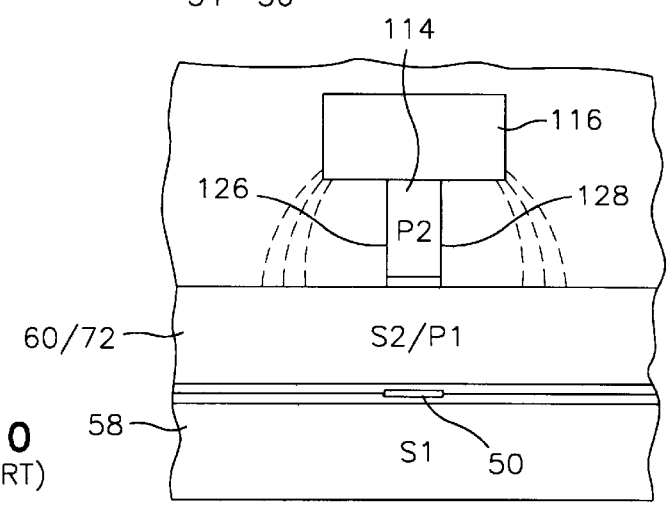
FIG. 10 is a view taken along plane X—X of FIG. 9.
Figure 17:
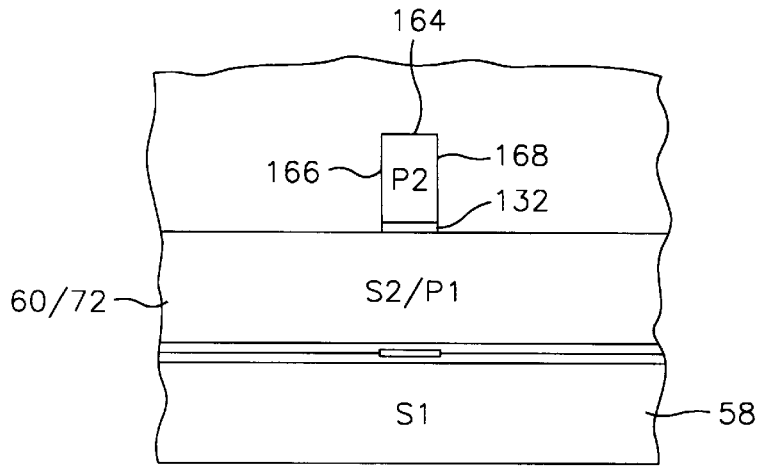
FIG. 17 is a view taken along plane XVII—XVII of FIG. 16 prior to ion milling of the first pole piece.

Another prior art head 110 is illustrated in FIG. 9 which is similar to the prior art head shown in FIG. 4 except that the second pole piece 112 is constructed of first and second components 114 and 116. The first component 114 is constructed at the ABS before the formation of the first, second and third insulation layers 118, 120 and 122 and the coil layer 124. In this structure, the photo-lithography step to produce the first component of the second pole piece 114 is done right after the write gap 76 is formed. At this stage the surface is planar since the sloping resist structures have not yet been formed. Therefore, the first component of the pole tip 114 can be constructed with well-defined side walls 126 and 128, as shown in FIG. 10. Further, the well-defined second pole tip 114 permits well-defined notching of the first pole piece 72, as shown in FIG. 17. After construction of the first component 114, the first insulation layer 118 is formed, the coil layer 124 is formed on the first insulation layer, the second insulation layer is formed on the coil layer 124 and the first insulation layer 118, and the third insulation layer 122 is formed on the second insulation layer 120. Thereafter, the photoresist layer (not shown) is photo-imaged for the construction of the second component 116 from the ABS to the back gap (not shown). The ABS view in FIG. 10 shows the second component 116 which, with the first component 114, results in the second pole tip at the ABS as having a "T" configuration. Unfortunately, flux fringes between the first and the second components 114 and 116, as shown by the flux lines in FIG. 10, cause overwriting of adjacent tracks on a rotating magnetic disk. The present invention overcomes the overwriting problems manifest in the prior art magnetic heads shown in FIGS. 4 and 9 and permits greater flexibility in the locations of the flare point.

Figure 11:
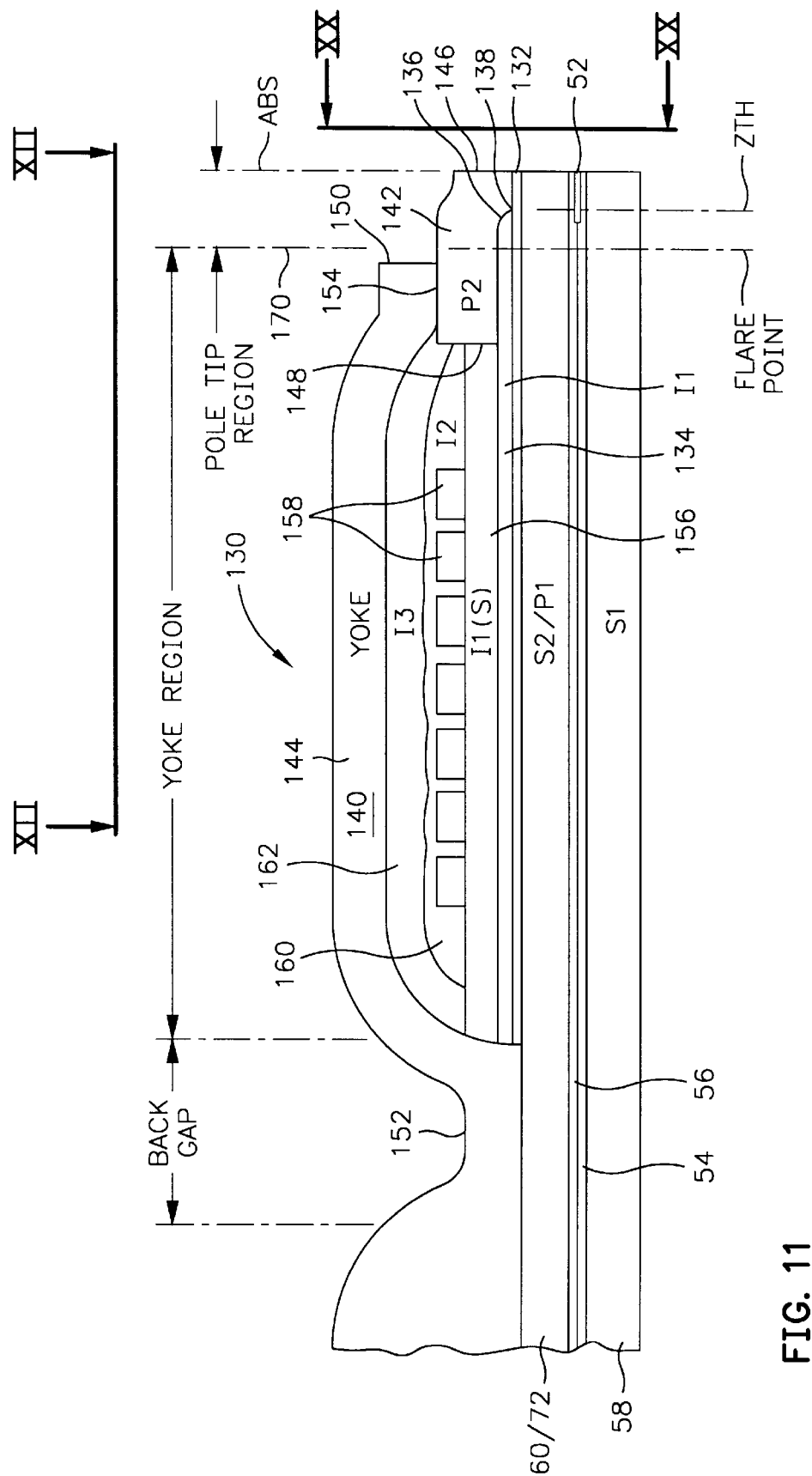
FIG. 11 is a cross-sectional side view of the present invention.

FIG. 11 illustrates a first embodiment 130 of the present invention. In the same manner as the prior art heads, this inductive write head has an MR sensor 52 which is sandwiched between first and second gap layers 54 and 56 which are, in turn, sandwiched between first and second shield layers 58 and 60. A write gap layer 132 is formed on top of the second shield layer and first pole piece layer 60/72. On top of the write gap layer 132 is a first insulation layer 134 which has a sloping surface 136 which commences at an apex 138. The sloping surface 136 faces the ABS. The second pole piece 140 has first and second components 142 and 144, the first component 142 extending from an ABS end 146 to a recessed end 148 located in the yoke region. The second component 144 extends from a recessed end 150, spaced from the ABS, to a back gap 152 where the first and second pole pieces 72 and 140 are connected. The second component 144 interfaces with the first component 142 in a stitched region 154 so that the first component defines a pole tip in a pole tip region and the second component defines a yoke in the yoke region. The first insulation layer 134 extends from its recessed end (apex 38) into the yoke region. The apex 138 of the first insulation layer 134 defines the ZTH. If desired, a supplemental first insulation layer 156 may be formed on top of the first insulation layer 134 so that it abuts the recessed end 148 of the first component 142. The coil layer 158 is formed on top of the supplemental first insulation layer 156 and a second insulation layer 160 is formed on top of the coil layer 158 and the supplemental first insulation layer 156. A third insulation layer 162 may be formed on top of the second insulation layer 160 in order to planarize the head.

Figure 12:
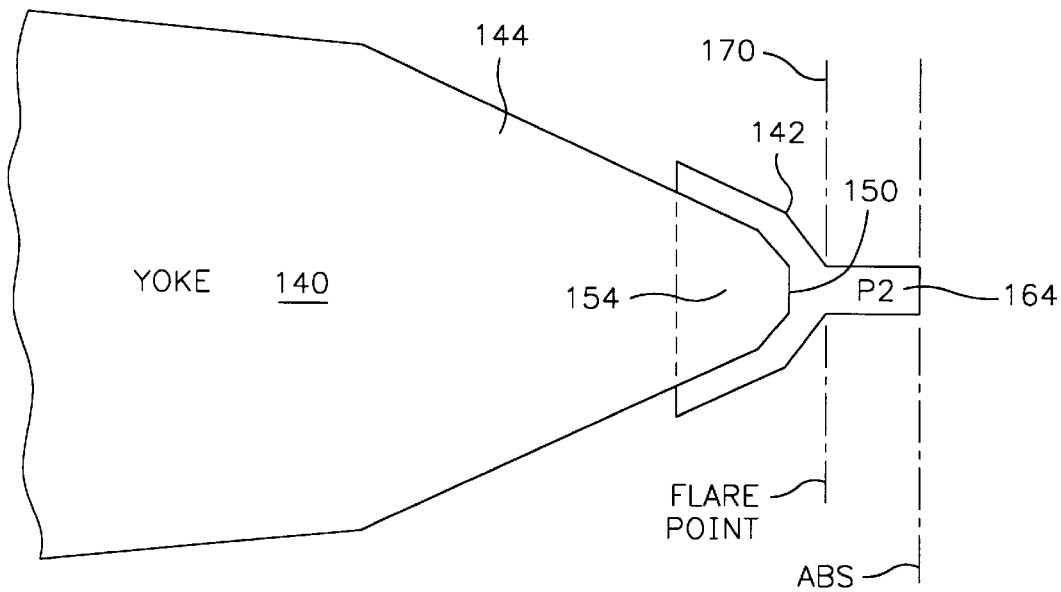
FIG. 12 is a view taken along plane XII—XII of FIG. 11 showing a first embodiment of the present invention.
Figure 18:
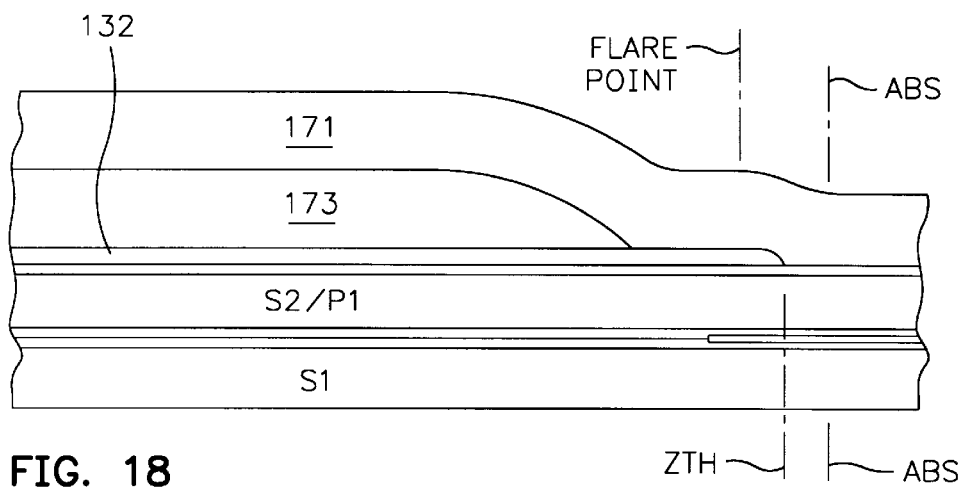
FIG. 18 is similar to FIG. 13 except an insulation layer is formed before forming the second pole tip.

In the first embodiment 130 the first component 142 defines the flare point position 170, as shown in FIG. 12. The first component has a flared surface which extends from the flare point into the yoke region and the second component 144 has a flared surface which is recessed from the flare point 170. It is these two surfaces that interface one another and are stitched at 154, as shown in FIGS. 11 and 12. In this embodiment, the flare point can be very accurately located by patterning the first component 142 with its flared portion. In this embodiment, a second pole tip 164 is formed which has well-defined side walls 166 and 168, as shown in FIG. 18. The second component 144 does not appear in the ABS view of FIG. 18 since it is recessed in the head. Accordingly, there is no overwriting due to flux fringing between the second pole piece components, which is a problem with the prior art head 110, as shown in FIG. 10. Also of significance is that the second pole tip 164 is constructed without the aforementioned reflective notching problem, since the second component of the pole piece 144 is processed on the planar region of the first pole tip 142.

Figure 13:
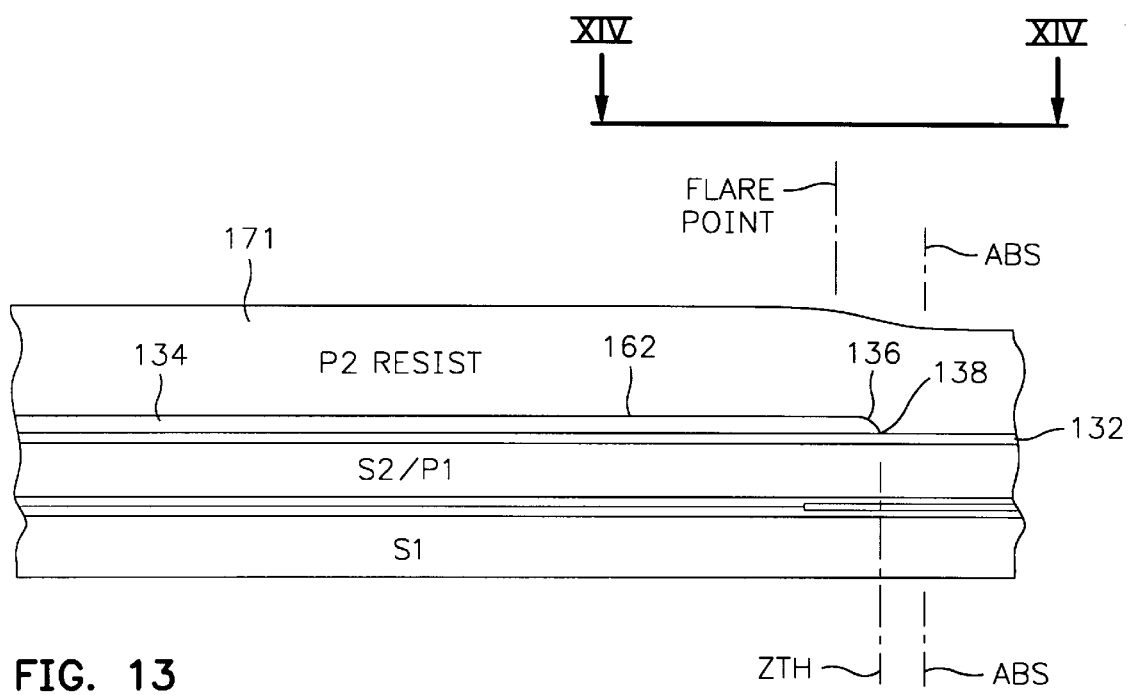
FIG. 13 is a cross-sectional side view of the magnetic head shown in FIG. 11 in a partially completed condition.
Figure 14:
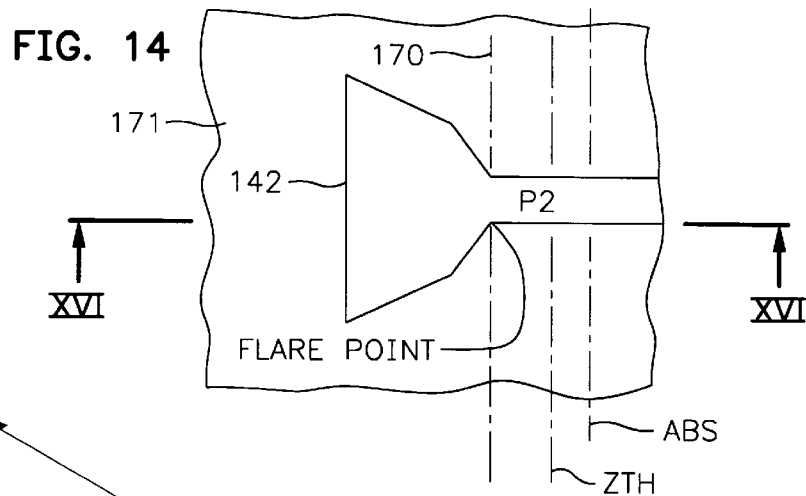
FIG. 14 is a view taken along XIV—XIV of FIG. 13.
Figure 15:
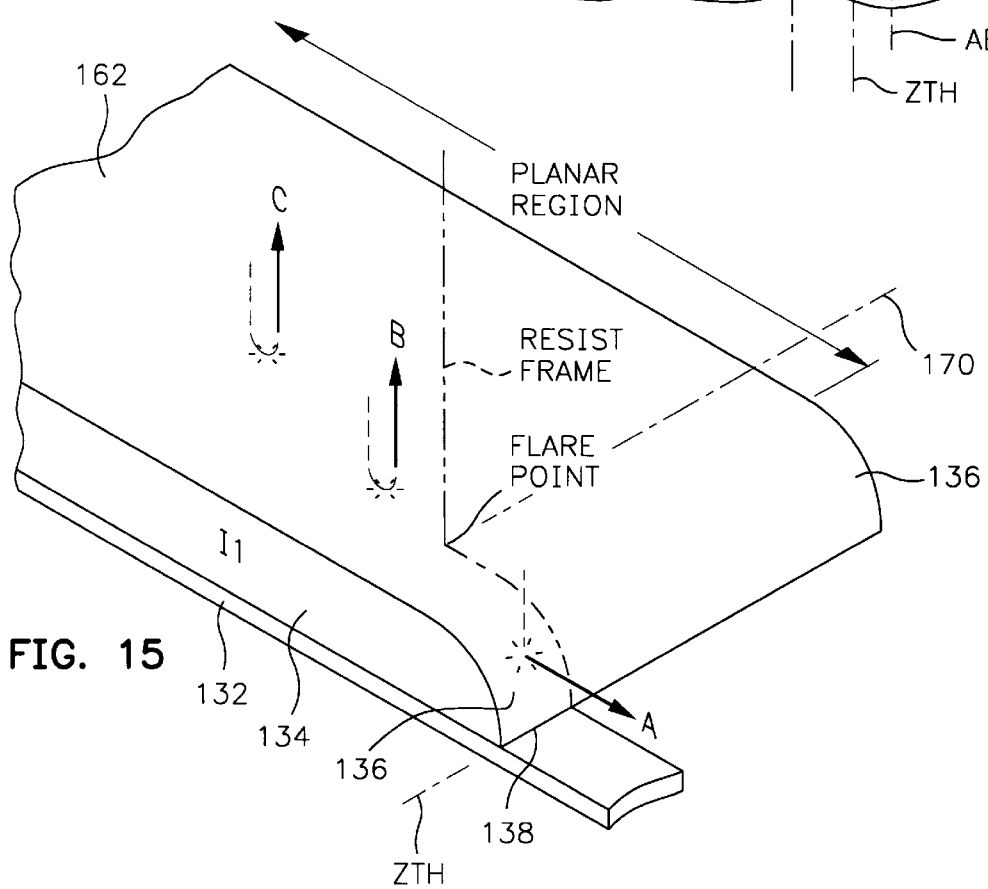
FIG. 15 is an isometric view of FIG. 13 with the photoresist layer removed so as to show the first insulation layer.
Figure 16:
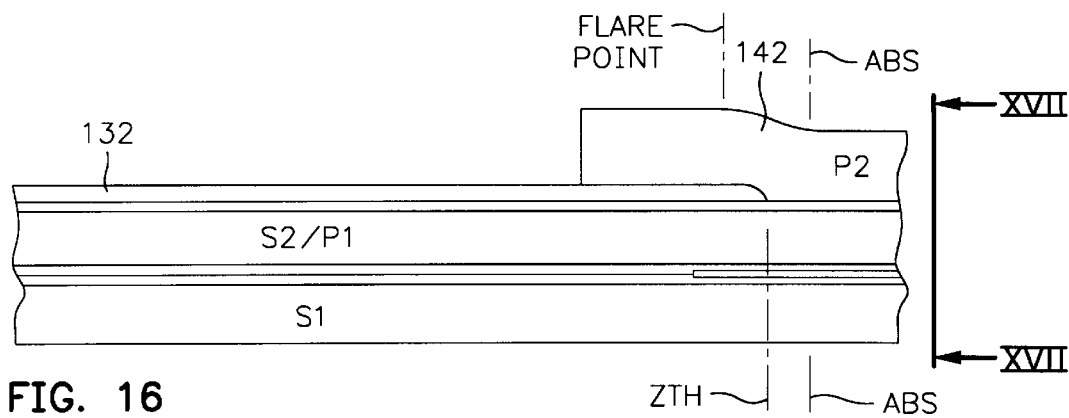
FIG. 16 is the same as FIG. 13 except the first component of the second pole piece has been plated and the photoresist layer has been removed.
Figure 19:
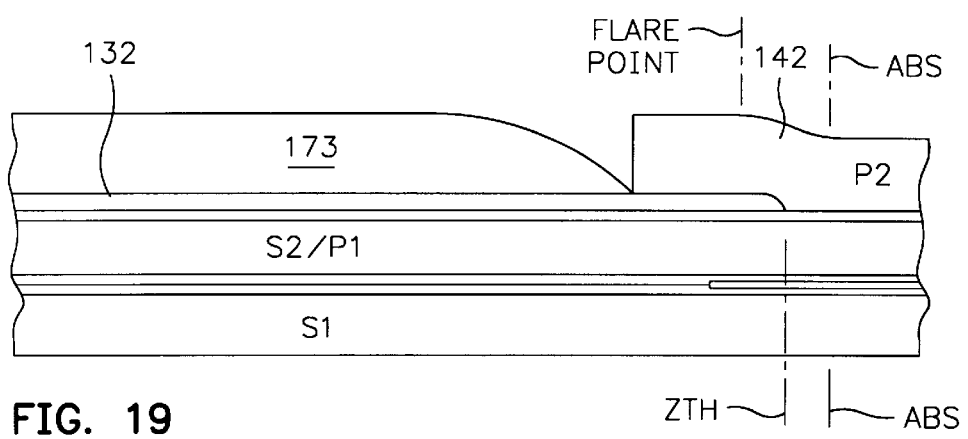
FIG. 19 is similar to FIG. 16 except the second pole tip has been formed after formation of an insulation layer.

The construction of the first embodiment of the present invention is shown in FIGS. 13–17. In FIG. 13 a photoresist layer 171 is shown spun on top of the write gap layer 132 and the first insulation layer 134. It can be seen from FIGS. 13 and 15 that the first insulation layer 134 has a large planar region 162 behind its sloping portion 136. In comparison with the photoresist layer 102 in FIG. 6, it can be seen that the photoresist layer 171 in FIG. 13 is more uniform in its height because of this planar region 162. While the preferred thickness of the first insulation layer 134 is four times the thickness of the write gap layer 132 it may be as thin as the write gap layer 132. Since the flared region of the second pole piece 140 (see FIG. 12) commencing at the flare point 170 is located within the planar region 162 of the first insulation layer 134, all light photo-imaging the photoresist layer 171 will be reflected back to its source, as shown by notations "B" and "C" in FIG. 15. Light reflected from the sloping surface 136 of the first insulation layer will be reflected by an angle of incidence directly into the pole tip region without any reflective notching, since the flare point 170 is recessed from this location. Accordingly, with the present invention there is no reflective notching of the second pole tip. The pole tip is formed with well-defined side walls 166 and 168, as shown in FIG. 17, which are parallel with respect to one another and perpendicular to the plane of the first pole piece. After photo-imaging and developing the resist layer 171, the first component 142 is plated and the resist layer 171 is removed, as shown in FIG. 16. If desired one or more insulation layers 173 may be deposited with or without coil layers before the second pole tip is formed as shown in FIG. 18. FIG. 18 also shows the photoresist layer 171 deposited which will be patterned as shown in FIGS. 14 and 15. The second pole tip 142 is then plated and the photoresist layer 171 is removed as shown in FIG. 19. It should be noted that the one or more insulation layers 123 will not cause reflective notching of the pole tip region since the light exposure is confined to the planar region of the first insulation layer 132. An ABS view of FIG. 19 will look like FIG. 17.

Figure 20:
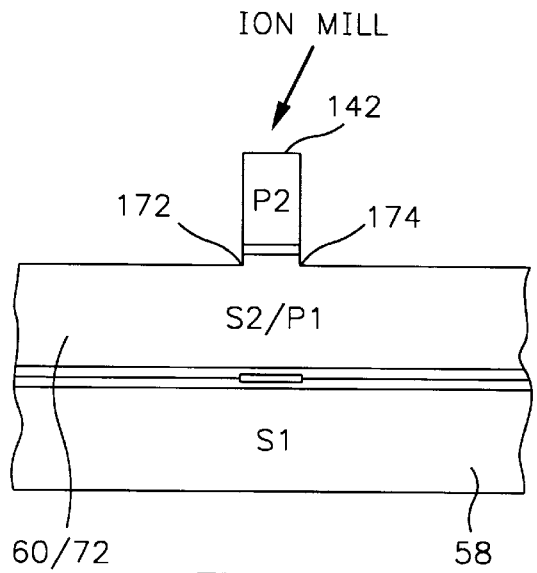
FIG. 20 is an ABS view of FIG. 11 taken along plane XX—XX of the completed head after ion milling the first pole piece.
Figure 21:
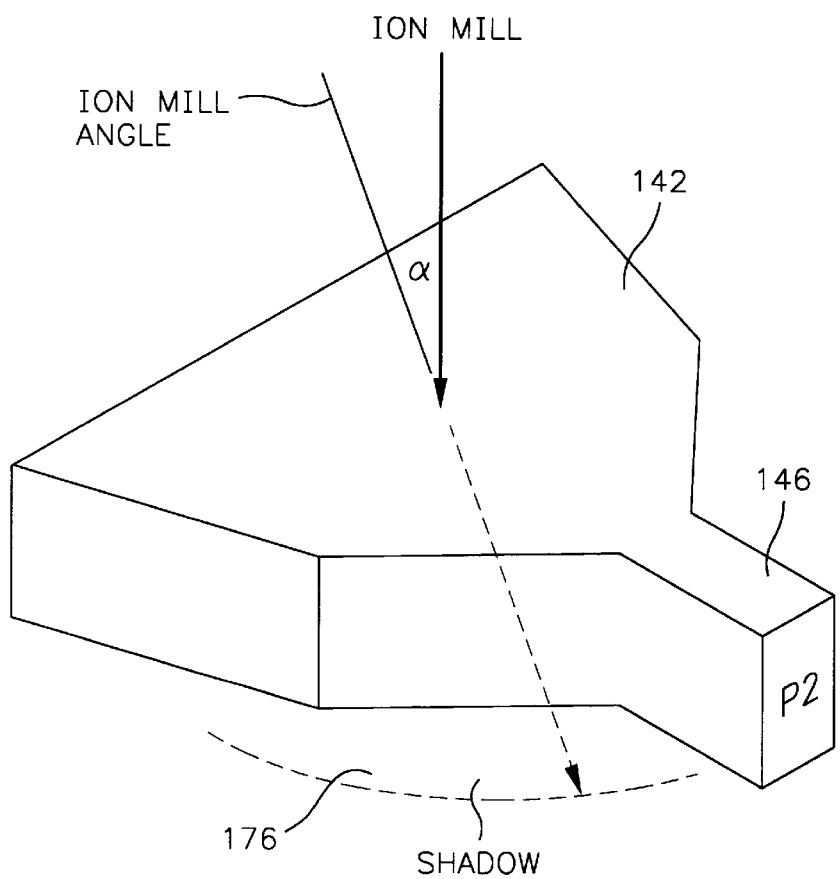
FIG. 21 schematically illustrates a shadowing effect when the first pole piece is being notched by ion milling.

In FIGS. 20 and 21 there is shown an ion milling step for notching the first pole piece at 172 and 174. The first component 142 is employed as a mask for ion milling the first pole piece to create the notching. The ion milling angle varies between 10° to 80° from a vertical while the wafer upon which the magnetic head is located is rotated about a vertical axis. This inhibits the milling beam to reach the notching region of the first pole piece 60/72 on each side of the pole tip 146, one of the shadowed regions being shown at 176, due to the flared region of the second component 142 behind the pole tip 146. The second embodiment of the invention, to be described hereinafter, has an advantage over the first embodiment in that the shadowing 176 shown in FIG. 21 is reduced.

Figure 22:
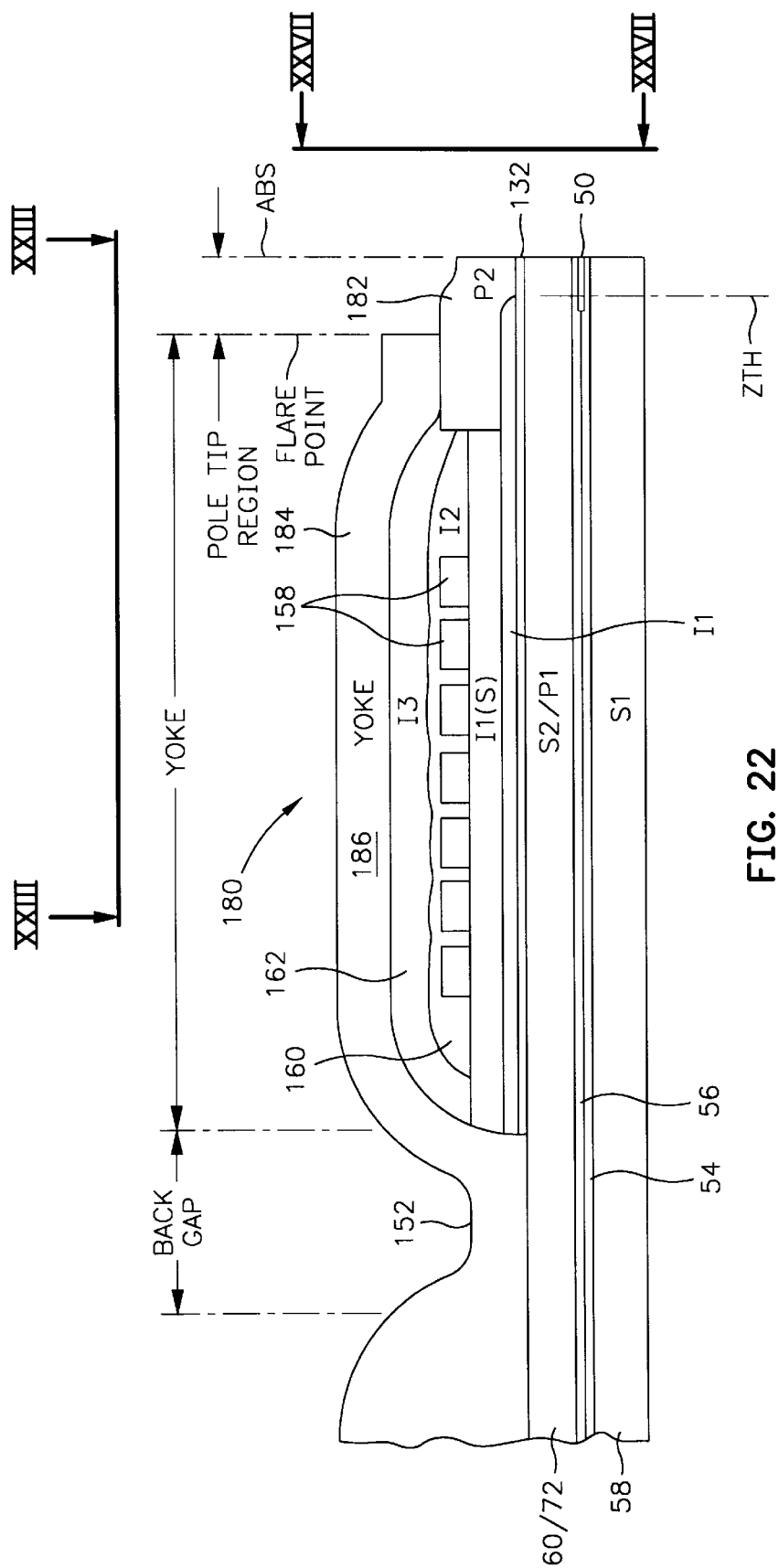
FIG. 22 is a cross-sectional elevation view of another embodiment of the present invention.
Figure 23:
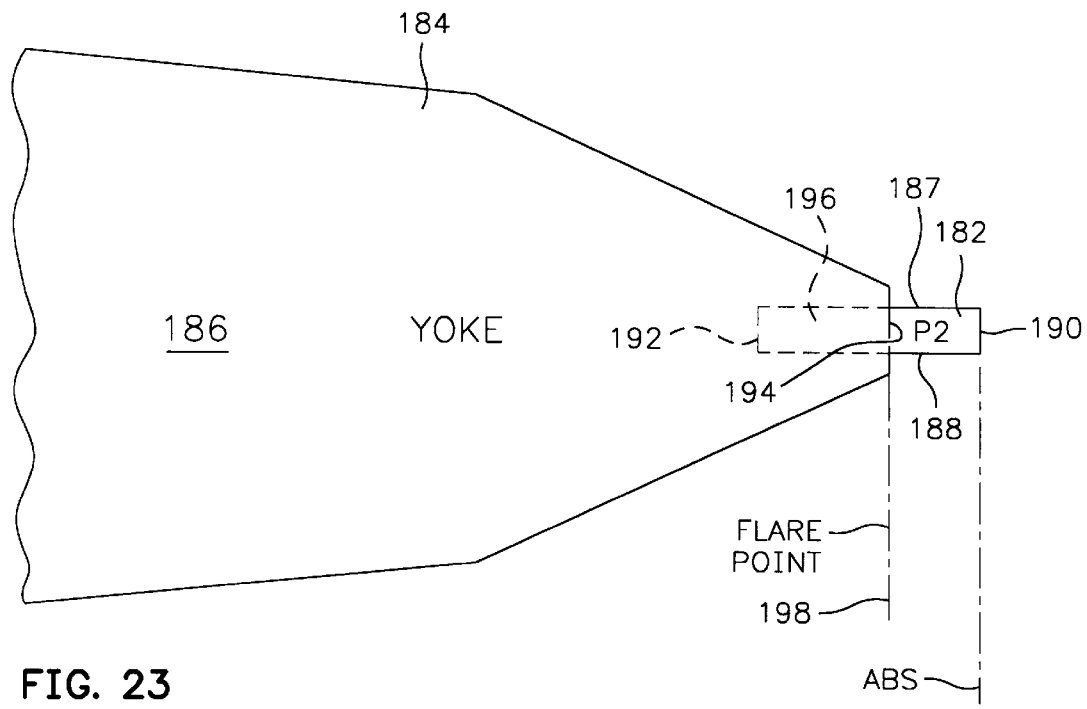
FIG. 23 is a view taken along plane XXIII—XXIII of FIG. 22.
Figure 24:
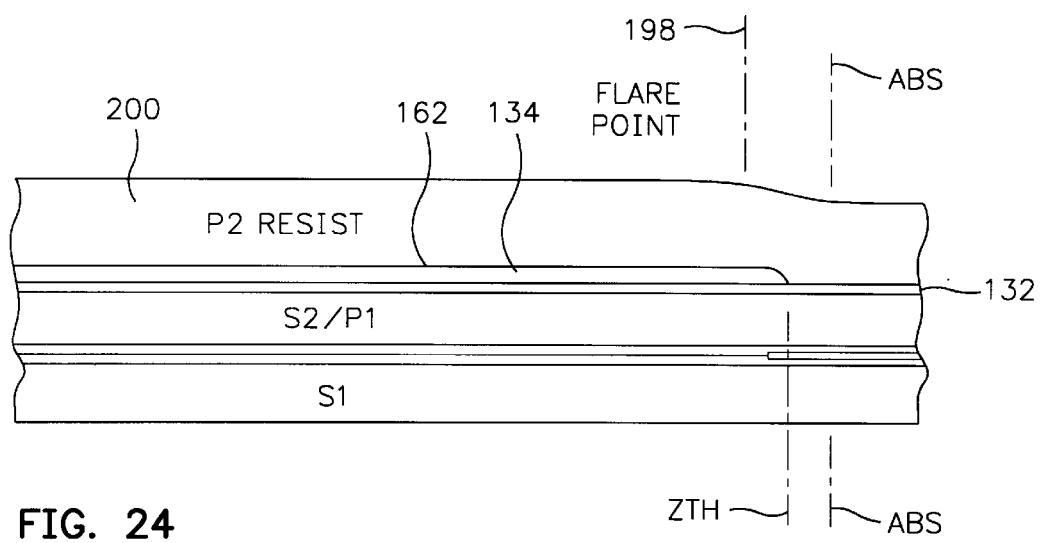
FIG. 24 is a cross-sectional side view of the magnetic head in FIG. 22 in a partially completed condition.

The second embodiment 180 of the present invention is shown in FIG. 22. The only difference in the second embodiment 180 over the first embodiment 130 are the configurations of the first and second components 182 and 184 of the second pole piece 186, as shown in FIG. 23. The first component has parallel side walls 187 and 188 extending from its ABS end 190 to its recessed end 192. Accordingly, the first component 182 is a long slender rectangular element in contrast to the flared component 144 shown in FIG. 12. The second component 184 has a recessed end 194 which is spaced from the ABS. The second component 184 preferably has a width at its recessed end 194 which is wider than the first component 182 so that when the second component 184 is stitched to the first component 182 at 196 the recessed end 194 of the second component 184 defines the flare point 198. Accordingly, in the second embodiment 180 the second component 184 defines the flare point 198 whereas in the first embodiment 130 the first component 144 defines the flare point. The construction of the second component 182 is shown in FIGS. 24 and 25. In FIG. 24 a photoresist layer 200 is spun on top of the write gap layer 132 and the first insulation layer 134. The photoresist layer 200 has a substantially uniform thickness similar to that shown in FIG. 16. Reflective notching is not present because of the planar region 162 and the location of the flare point 198. After plating the first component 182 and the removal of the photoresist layer, the second component 184 is formed as shown in FIGS. 22 and 23. As shown in FIG. 26, the first component 182 has well-defined side walls 186 and 188 which are parallel with respect to one another and perpendicular to the ABS. In FIGS. 27 and 28, ion milling is employed to notch the first pole piece at 202 and 204, as seen in FIG. 27. Again the ion milling angle varies between 10° to 80° to the vertical and results in the shadowing at 206, as shown in FIG. 28. This is less of a shadow than shadow 176 in FIG. 21, since there is no flared portion of the first component 182. Accordingly, the notches 202 and 204 in FIG. 27 will form with less milling than the notches 172 and 174 in FIG. 20.

Figure 29:
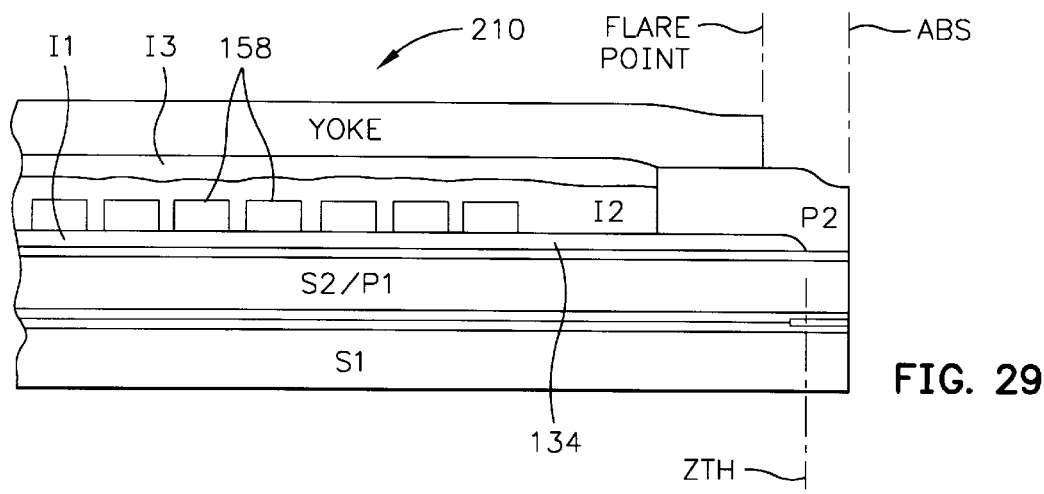
FIG. 29 is a cross-sectional side view of a third embodiment of the present invention.
Figure 30:
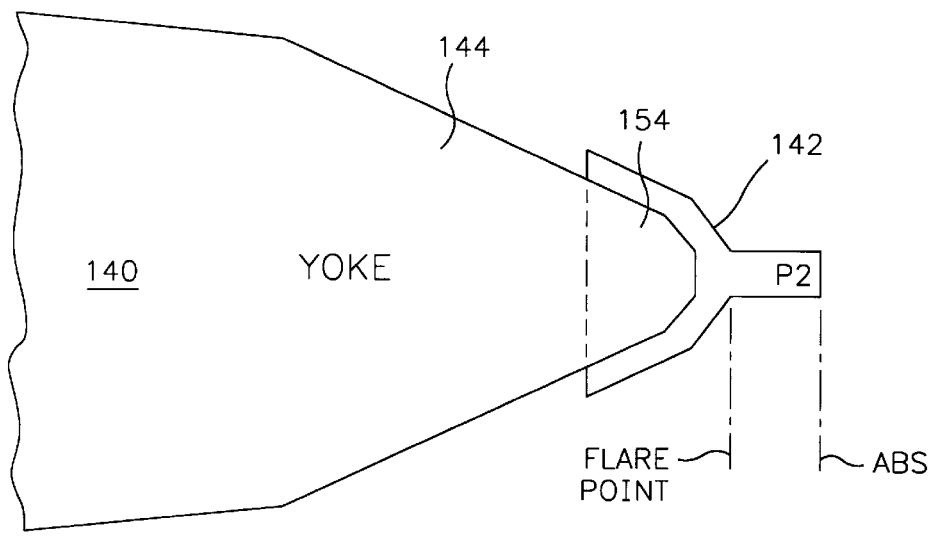
FIG. 30 is a top view of FIG. 29 illustrating the third embodiment modified by the first embodiment of the present invention.
Figure 31:
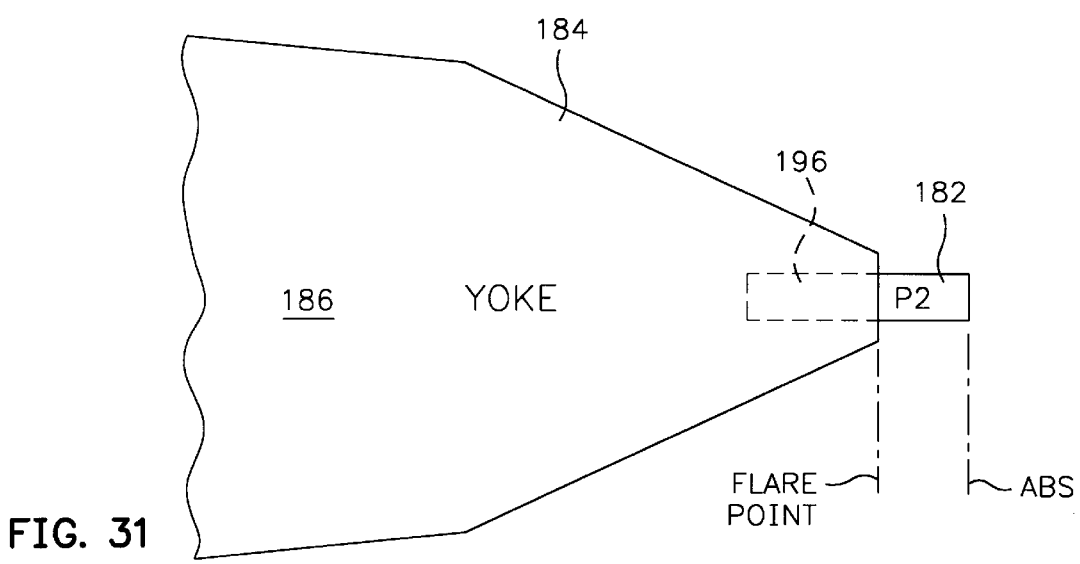
FIG. 31 is a top view of FIG. 29 showing the third embodiment modified by the second embodiment of the present invention.

A third embodiment 210 of the present invention is illustrated in FIG. 29. This embodiment differs from the embodiments 130 and 180, shown in FIGS. 11 and 22, in that the embodiment 210 locates the coil layer 158 directly on the first insulation layer 134. This saves the step of constructing a supplemental first insulation layer, as shown in the first and second embodiments. This third embodiment may employ either of the features of the first and second embodiments, as shown in FIGS. 30 and 31.

It should be noted that the thickness of the photoresist layer 171 in the present embodiment (FIGS. 13, 18 and 24) is less than the thickness of the prior art photoresist layer 102 in FIG. 6. This permits the second pole tip to have a lower height and a narrower track width for higher density recording.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making an inductive write head, which has a flare point and a yoke region, comprising the unordered steps of:

forming a first pole piece layer which extends between an air bearing surface (ABS) and a back gap;

forming a write gap layer on top of the first pole piece layer;

forming a first insulation layer on top of the write gap layer with a rounded recessed end which is spaced from said ABS;

forming a first component of a second pole piece layer on top of the write gap layer and on top of the first insulation layer with an ABS end at the ABS, with a recessed end spaced from the ABS and with a flat portion perpendicular to the ABS between the rounded recessed end of the insulation layer and the recessed end of the first component; and forming a second component of the second pole piece layer on top of the flat portion of the first component with a recessed end which is spaced from the ABS.

2. A method as claimed in claim 1, including:

forming the rounded recessed end of the first insulation layer between the ABS and the flare point.

3. A method as claimed in claim 1, including:

forming the first component with substantially parallel walls which are perpendicular to the ABS in the pole tip region.

4. A method as claimed in claim 1, including:

forming an insulation stack in the yoke region between the first pole piece layer and said second component with a recessed end which is spaced from said ABS and engages the recessed end of the first component.

5. A method as claimed in claim 1, including:

forming a coil layer on the first insulation layer.

6. A method as claimed in claim 1, including:

forming an insulation stack with a supplemental first insulation layer which is sandwiched between the first insulation layer and the coil layer.

7. A method as claimed in claim 1, including:

forming the first pole piece layer flat and parallel to the flat portion of the first component; and forming the write gap layer with a first portion sandwiched between the first pole piece layer and a first portion of the first component and with a first portion of the insulation layer sandwiched between a second portion of the write gap layer and a second portion of the first component.

8. A method as claimed in claim 7, including:

ion beam milling the first pole piece using the first component as a mask until the first pole piece has substantially the same width at the ABS as the first component of the second pole piece layer at the ABS.

9. A method as claimed in claim 1, including:

forming the first insulation layer with a flat portion as it extends from its rounded recessed end into the yoke region.

10. A method as claimed in claim 9, including:

forming the first component with a flared surface which extends from a flare point toward the back gap and is located entirely on the flat portion of the first insulation layer;

forming the second component with a flared surface which is recessed from the ABS; and interfacing the flared surfaces of the first and second components.

11. A method as claimed in claim 9, including:

forming at least a portion of the first component extending from the ABS end with parallel side walls which are spaced by a width and substantially perpendicular to the ABS;

forming the recessed end of the second component with a width which is greater than the width of said at least a portion of the first component; and positioning the recessed end of the second component on and in contact with said at least a portion of the first component so that the recessed end of the second component defines a flare point.

12. A method as claimed in claim 9, including:

forming the first component with a second pole tip portion which extends from the ABS to a flare point and a flared surface which extends from the flare point toward the back gap; and forming the second component on the flared surface of the first component.

13. A method as claimed in claim 12, including:

forming the rounded recessed end of the first insulation layer between the ABS and the flare point.

14. A method as claimed in claim 13, including:

forming an insulation stack in the yoke region between the first pole piece layer and said second component with a recessed end which is spaced from said ABS and engages the recessed end of the insulation stack.

15. A method as claimed in claim 14, including:

forming a coil layer on the first insulation layer.

16. A method as claimed in claim 15, including:

forming the first pole piece layer flat and parallel to the flat portion of the first component; and forming the write gap layer with a first portion sandwiched between the first pole piece layer and a first portion of the first component and with a first portion of the insulation layer sandwiched between a second portion of the write gap layer and a second portion of the first component.

17. A method as claimed in claim 16, including:

forming an insulation stack with a supplemental first insulation layer which is sandwiched between the first insulation layer and the coil layer.

18. A method as claimed in claim 16, including:

notching the first pole piece at the ABS so that it has substantially the same width as the first component at the ABS.

19. A method as claimed in claim 16, including:

forming the first insulation layer with a yoke portion which is flat.

20. A method as claimed in claim 1, including:

forming the parallel side walls of the first component from the ABS end to the recessed end of the first component.

21. A method as claimed in claim 20, including:

forming the rounded recessed end of the first insulation layer between the ABS and the flare point.

22. A method as claimed in claim 21, including:

forming an insulation stack in the yoke region between the first pole piece layer and said second component with a recessed end which is spaced from said ABS and engages the recessed end of the insulation stack.

23. A method as claimed in claim 22, including:

forming a coil layer on the first insulation layer.

24. A method as claimed in claim 23, including:

forming the first pole piece layer flat and parallel to the flat portion of the first component; and forming the write gap layer with a first portion sandwiched between the first pole piece layer and a first portion of the first component and with a first portion of the insulation layer sandwiched between a second portion of the write gap layer and a second portion of the first component.

25. A method as claimed in claim 24, including:

forming an insulation stack with a supplemental first insulation layer which is sandwiched between the first insulation layer and the coil layer.

26. A method as claimed in claim 24, including:

ion beam milling the first pole piece using the first component as a mask until the first pole piece has substantially the same width at the ABS as the first component of the second pole piece layer at the ABS.

27. A method as claimed in claim 24, including:

forming the first insulation layer with a yoke portion which is flat.

* * * * *